(12) United States Patent
Okamoto

(10) Patent No.: US 7,972,500 B2
(45) Date of Patent: Jul. 5, 2011

(54) WASTE WATER PURIFICATION APPARATUS

(75) Inventor: Ryoichi Okamoto, Fukuyama (JP)

(73) Assignee: Eiwa Land Environment Co., Ltd (JP)

( * ) Notice: Subject to any disclaimer, the term of this patent is extended or adjusted under 35 U.S.C. 154(b) by 1193 days.

(21) Appl. No.: 11/658,424

(22) PCT Filed: Jul. 30, 2004

(86) PCT No.: PCT/JP2004/011285
§ 371 (c)(1),
(2), (4) Date: Jan. 26, 2007

(87) PCT Pub. No.: WO2006/011241
PCT Pub. Date: Feb. 2, 2006

(65) Prior Publication Data
US 2008/0314806 A1  Dec. 25, 2008

(51) Int. Cl.
*C02F 3/12* (2006.01)
(52) U.S. Cl. ............ 210/86; 210/97; 210/180; 210/181; 210/195.1; 210/253; 210/259
(58) Field of Classification Search .............. 210/86, 210/180, 181, 97, 195.1, 253, 259, 542, 197
See application file for complete search history.

(56) References Cited

U.S. PATENT DOCUMENTS

| | | | |
|---|---|---|---|
| 4,211,654 | A | 7/1980 | Weber et al. |
| 6,361,685 | B1 | 3/2002 | Shimada |
| 6,808,622 | B2 | 10/2004 | Okamoto et al. |
| 2003/0132148 | A1 | 7/2003 | Okamoto et al. |

FOREIGN PATENT DOCUMENTS

| | | |
|---|---|---|
| CN | 1422812 | 6/2003 |
| GB | 2006743 | 5/1979 |
| GB | 2224728 A | 5/1990 |
| JP | 58006292 A * | 1/1983 |
| JP | 59225798 | 12/1984 |
| JP | 2-222788 | 9/1990 |
| JP | 3-98998 | 10/1991 |
| JP | 4-235798 | 8/1992 |
| JP | 7024498 | 1/1995 |
| JP | 7185589 | 7/1995 |
| JP | 8299995 | 11/1996 |
| JP | 9-75964 | 3/1997 |
| JP | 9136100 | 5/1997 |
| JP | 9174073 | 7/1997 |
| JP | 2756657 | 5/1998 |
| JP | 10216799 | 8/1998 |

(Continued)

*Primary Examiner* — Terry K Cecil
(74) *Attorney, Agent, or Firm* — Gerald E. Hespos; Michael J. Porco

(57) ABSTRACT

A wastewater purifying apparatus has plural treatment chambers for stepwise purifying wastewater discharged from a lavatory, a storage chamber for storing purified wastewater derived from the downstream-most treatment chamber, and a purified wastewater storage tank. A suction port is formed in the upstream-most treatment chamber for sucking the wastewater. Refluxing equipment refluxes wastewater from the treatment chambers downstream of the upstream-most treatment chamber into the upstream most treatment chamber. A purified wastewater supplier supplies the purified wastewater in the purified wastewater storage tank into the upstream-most treatment chamber. The above arrangement performs expedient and sophisticated purification treatment of the wastewater containing sludge components, such as sewage discharged from the lavatory, or miscellaneous effluents generated by pulverizing garbage by a disposer. The arrangement also simplifies washing of the apparatus.

11 Claims, 11 Drawing Sheets

FOREIGN PATENT DOCUMENTS

| | | |
|---|---|---|
| JP | 11293738 | 10/1999 |
| JP | 11-333489 | 12/1999 |
| JP | 2000-185299 | 7/2000 |
| JP | 2000-257133 | 9/2000 |
| JP | 2001-020354 | 1/2001 |
| JP | 2001170693 | 6/2001 |
| JP | 2001-239288 | 9/2001 |
| JP | 2001293496 | 10/2001 |
| JP | 2001327989 | 11/2001 |
| JP | 2002143895 | 5/2002 |
| JP | 2002143897 | 5/2002 |
| JP | 2002-248500 | 9/2002 |
| JP | 2002-282877 | 10/2002 |
| JP | 2002-301491 | 10/2002 |
| JP | 2002-326094 | 11/2002 |
| JP | 2003-001280 | 1/2003 |
| JP | 2003-039100 | 2/2003 |
| JP | 2003306394 | 10/2003 |
| JP | 2003-326237 | 11/2003 |
| JP | 2005034753 | 2/2005 |
| JP | 2005058827 | 3/2005 |
| JP | 2005-246384 | 9/2005 |
| WO | 03033420 | 4/2003 |

* cited by examiner

WASTE WATER PURIFICATION APPARATUS

BACKGROUND OF THE INVENTION

1. Field of the Invention

The present invention relates to a wastewater purifying apparatus that enables to perform expedient and sophisticated purification treatment of wastewater containing sludge components such as sewage or miscellaneous effluents generated by pulverizing garbage by a disposer.

2. Description of the Related Art

Heretofore, there has been known a high-level treatment purifying vessel, as disclosed in e.g. Japanese Patent No. 2,756,657. The vessel comprises: a first aeration chamber for aerating sewage via oyster shells as a contact member; an anaerobic filter bed chamber for keeping overflow sewage from the first aeration chamber in contact with a porous artificial filter member for anaerobic decomposition; a second aeration chamber for flowing the sewage treated in the anaerobic filter bed chamber for aeration treatment, using oyster shells as a contact member; and a finishing treatment chamber for introducing wastewater treated in the second aeration chamber and keeping the wastewater in contact with activated carbon to perform a high-level treatment for decolorization and deodorization. The vessel further includes, as chambers for pre-processing the sewage to be introduced into the first aeration chamber, a sedimentation/separation chamber for sedimenting the sewage for separation; a contact aeration chamber for flowing a liquid of the sewage obtained by the sedimentation and the separation for contact aeration; and a sedimentation chamber for storing the sewage which has undergone the contact aeration in the contact aeration chamber to feed the treated sewage to the first aeration chamber.

The wastewater purifying apparatus i.e. the high-level purifying vessel provided with the sedimentation/separation chamber, the contact aeration chamber, the first aeration chamber, the anaerobic filter bed chamber, the second aeration chamber, and the finishing treatment chamber enables to perform expedient and high-level wastewater purification by stepwise treating the wastewater such as sewage discharged from a lavatory. However, in the case where the wastewater purifying apparatus undergoes periodic inspection, or is required to be transferred after a temporary installation for a gathering event or the like, it is necessary to successively drain the wastewater from the treatment chambers such as the sedimentation/separation chamber and the contact aeration chamber, and thereafter wash the treatment chambers individually. The operation is cumbersome, and a time required for the washing operation is considerably long.

SUMMARY OF THE INVENTION

It is an object of the present invention to provide a wastewater purifying technology which is free from the above problems residing in the prior art.

It is another object of the present invention to provide a wastewater purifying apparatus that enables to perform expedient and sophisticated purification treatment of wastewater containing sludge components such as sewage discharged from a lavatory, or miscellaneous effluents generated by pulverizing garbage by a disposer, and to simplify a washing operation of the apparatus.

According to an aspect of the present invention, a wastewater purifying apparatus is provided with a plurality of treatment chambers for stepwise purifying wastewater containing sludge components such as sewage discharged from a lavatory, and a purified wastewater storage container for storing purified wastewater derived from a downstream most treatment chamber.

The apparatus is further provided with a device for refluxing treated wastewater from the treatment chamber at a downstream position of the upstream most treatment chamber into the upstream most treatment chamber, and a purified wastewater supplier for supplying the purified wastewater stored in the purified wastewater storage container into the upstream most treatment chamber.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS

In the following, an embodiment of the present invention is described in detail referring to the accompanying drawings.

Figure 1:
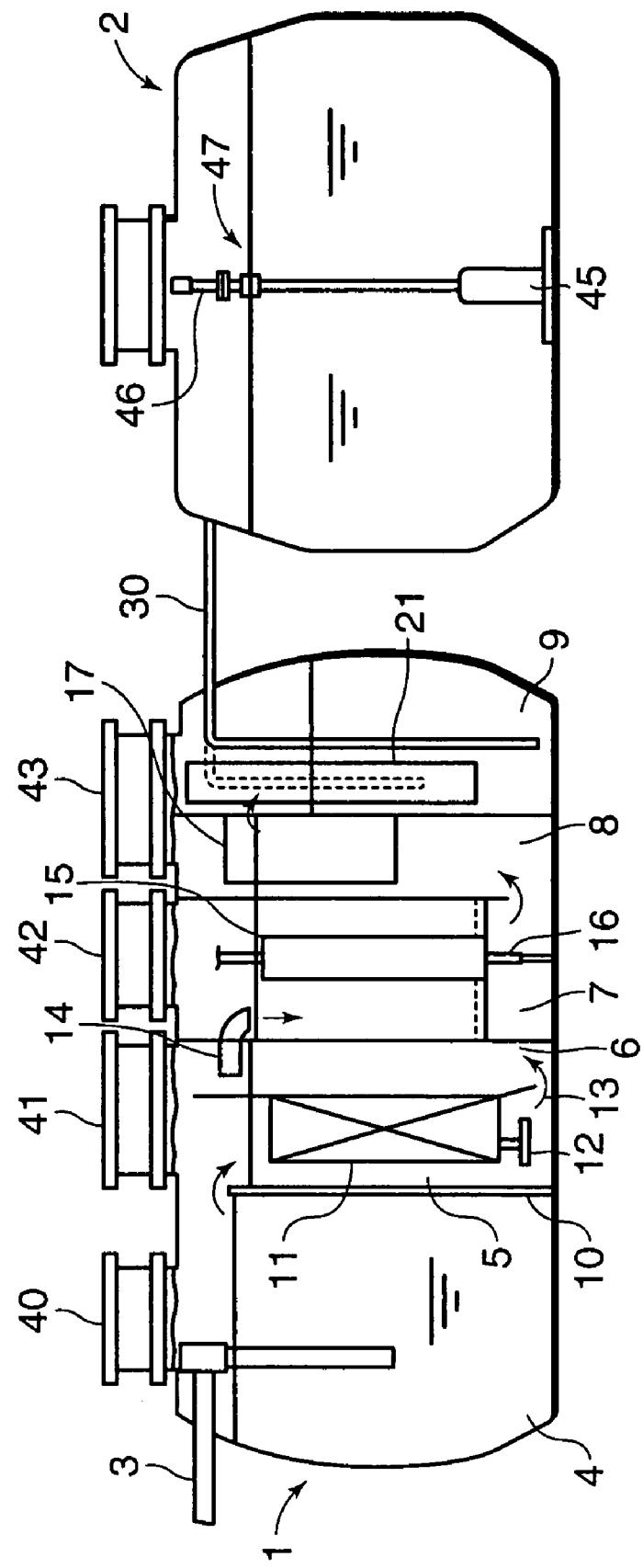
FIG. 1 is a diagram showing a wastewater purifying apparatus embodying the invention.
Figure 2:
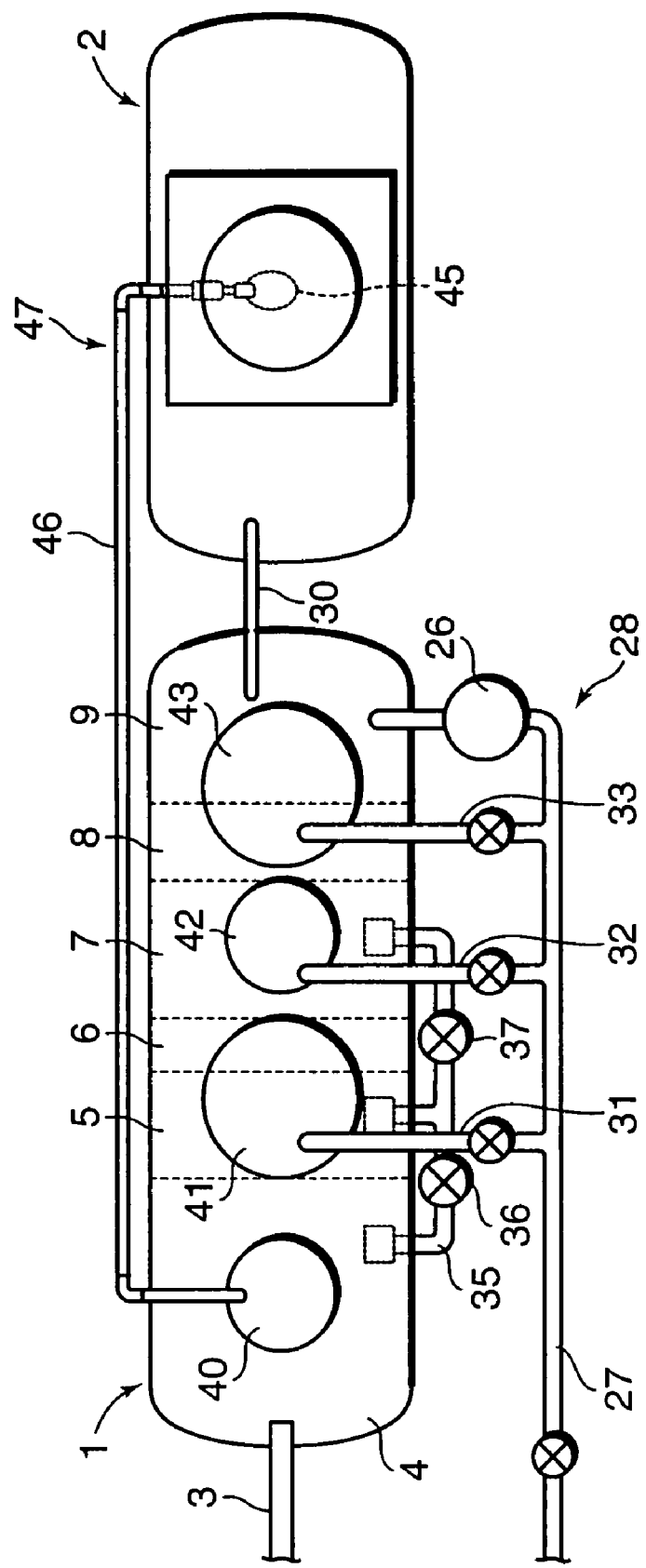
FIG. 2 is a plan view showing a construction of the wastewater purifying apparatus.

FIGS. 1 and 2 are diagrams showing a wastewater purifying apparatus embodying the invention. The wastewater purifying apparatus includes a wastewater treatment tank 1 made of a steel plate material, an aluminum alloy material, a stainless steel material, a plastic material, a PC (prestressed concrete) material, a reinforced concrete material, FRP (fiber reinforced plastic) material, a plastic material, or a like material; and a purified wastewater storage tank 2 for storing purified wastewater derived from the wastewater treatment tank 1. The wastewater treatment tank 1 and the purified wastewater storage tank 2 are laid underground, or stand upright on the ground in use.

The wastewater treatment tank 1 includes treatment tanks i.e. an upstream most treatment chamber 4 with a sedimentation/separation chamber, which is disposed on the most upstream position of the treatment chambers; a first intermediate treatment chamber 5 with a contact aeration chamber, which is disposed downstream of the upstream most treatment chamber 4; a second intermediate treatment chamber 6 with a sedimentation chamber, which is disposed downstream of the first intermediate treatment chamber 5; a third intermediate treatment chamber 7 with a contact filtration chamber, which is disposed downstream of the second intermediate treatment chamber 6; a downstream most treatment chamber 8 with a sedimentation/filtration chamber, which is disposed on the most downstream position of the treatment chambers; and a purified wastewater storage chamber 9 for storing treated wastewater derived from the downstream most treatment chamber 8 while performing decolorization.

The upstream most treatment chamber 4 i.e. the sedimentation/separation chamber is adapted to sediment sludge components such as paper and large-sized foreign matters in wastewater containing sludge components such as sewage discharged from an unillustrated lavatory through a drainage pipe 3, or miscellaneous effluents generated by pulverizing garbage by a disposer for separation, and then, introduce the water component obtained by the separation into the first intermediate treatment chamber 5 by overflow, while keeping the suspended solids in the first intermediate treatment chamber 5 from flowing out by a baffle plate 10. The sediment solids in the upstream most treatment chamber 4 are periodically e.g. every one year sucked outside for disposal.

A well-known plastic contact member 11 is loaded in the first intermediate treatment chamber 5 i.e. the contact aeration chamber. An aeration nozzle 12 is provided at a lower part of the plastic contact member 11 to release the air supplied from an unillustrated blower. When the treated wastewater is introduced into the first intermediate treatment chamber 5 from an upper part of the upstream most treatment chamber 4 by overflow, the sludge components in the water component are decomposed by microorganisms adhered to the plastic contact member 11, with the treated wastewater being agitated by the air released through the aeration nozzle 12.

A communication channel 13 is formed in a lower end portion of the wastewater treatment tank 1 between the first intermediate treatment chamber 5 and the second intermediate treatment chamber 6. The wastewater treated in the first intermediate treatment chamber 5 is introduced into the second intermediate treatment chamber 6 i.e. the sedimentation chamber via the communication channel 13 for sedimentation. The treated wastewater through the sedimentation in the second intermediate treatment chamber 6 is introduced into the third intermediate treatment chamber 7 via a conduit pipe 14 by overflow.

A shell/coral-based contact member 15 is loaded in the third intermediate treatment chamber 7 i.e. the contact filtration chamber. The shell/coral-based contact member 15 is constituted of shells such as oyster, scallop, Sakhalin surf clam, pearl shell, clam, fresh water clam, short-necked clam, Chinese mecta, mussel, top shell, giant clam, fossil shell or a like shell; or dead and bleached corals, which are packed in a mesh bag. An aeration nozzle 16 is provided below the shell/coral-based contact member 15 for releasing the air supplied from the blower.

Figure 3:
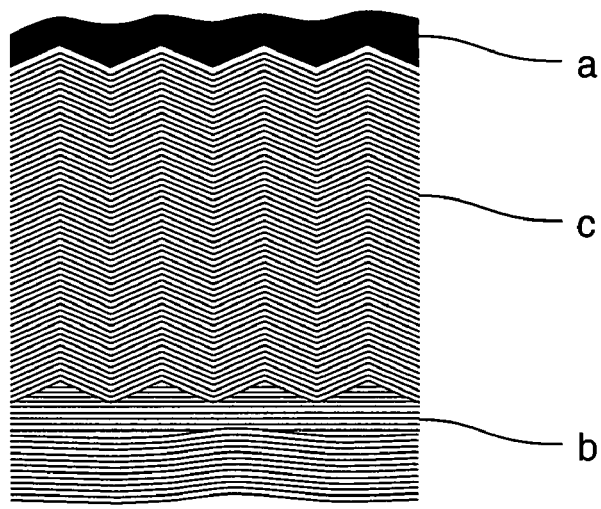
FIG. 3 is a cross-sectional view of a shell constituting a shell contact member.
Figure 4:
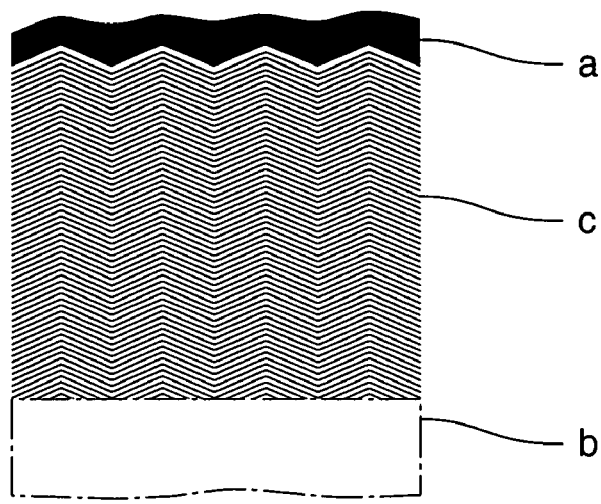
FIG. 4 is a cross-sectional view showing a state that a mother-of-pearl layer of the shell is removed.

The shell contains calcium carbonate as a major component, and calcium phosphate, magnesium carbonate, and the like, as minor components. As shown in FIG. 3, the shell includes shell epidermis "a" as an outer layer, a mother-of-pearl layer "b" as an inner layer, and a prismatic layer "c" as an intermediate layer. As shown in FIG. 4, the contact member 15 is formed by packing the shell in the bag, with the mother-of-pearl layer "b" of the shell being removed.

Examples of the process to remove the mother-of-pearl layer "b" from the shell include a method of scraping off the mother-of-pearl layer "b" by means of a proper machine tool, a method of leaving the shell at the water's edge of seashore for a period of about 1 year and allowing natural erosion of the mother-of-pearl layer "b", a method of dissolving the mother-of-pearl layer "b" by using a chemical such as hydrochloric acid or the like, and a method of scraping off the mother-of-pearl layer "b" by agitating a number of shells in a mixer and making mutual contact among the shells. When the mother-of-pearl layer "b" is removed either by the natural erosion method or the agitation method, part of the shell epidermis "a" is also removed along with the mother-of-pearl layer "b".

When the treated wastewater is introduced from the upper end of the second intermediate treatment chamber 6 into the third intermediate treatment chamber 7 by overflow, the sludge components in the treated wastewater are further decomposed by the microorganisms adhered to the shell/coral-based contact member 15, with the treated wastewater being agitated by the air released through the aeration nozzle 16.

The treated wastewater in the third intermediate treatment chamber 7 is introduced from the lower end thereof into the downstream most treatment chamber 8. The downstream most treatment chamber 8 i.e. the sedimentation/filtration chamber has a filter member 17 packed with zeolite, which is a porous member. The downstream most treatment chamber 8 is constructed in such a manner that impurities in the treated wastewater derived from the third intermediate treatment chamber 7 is sedimented for separation into the sewage and the supernatant, and that fine impurities in the supernatant are filtrated by the filter member 17 to generate purified wastewater. The purified wastewater generated in the downstream most treatment chamber 8 is introduced into the purified wastewater storage chamber 9 by overflow.

Figure 5:
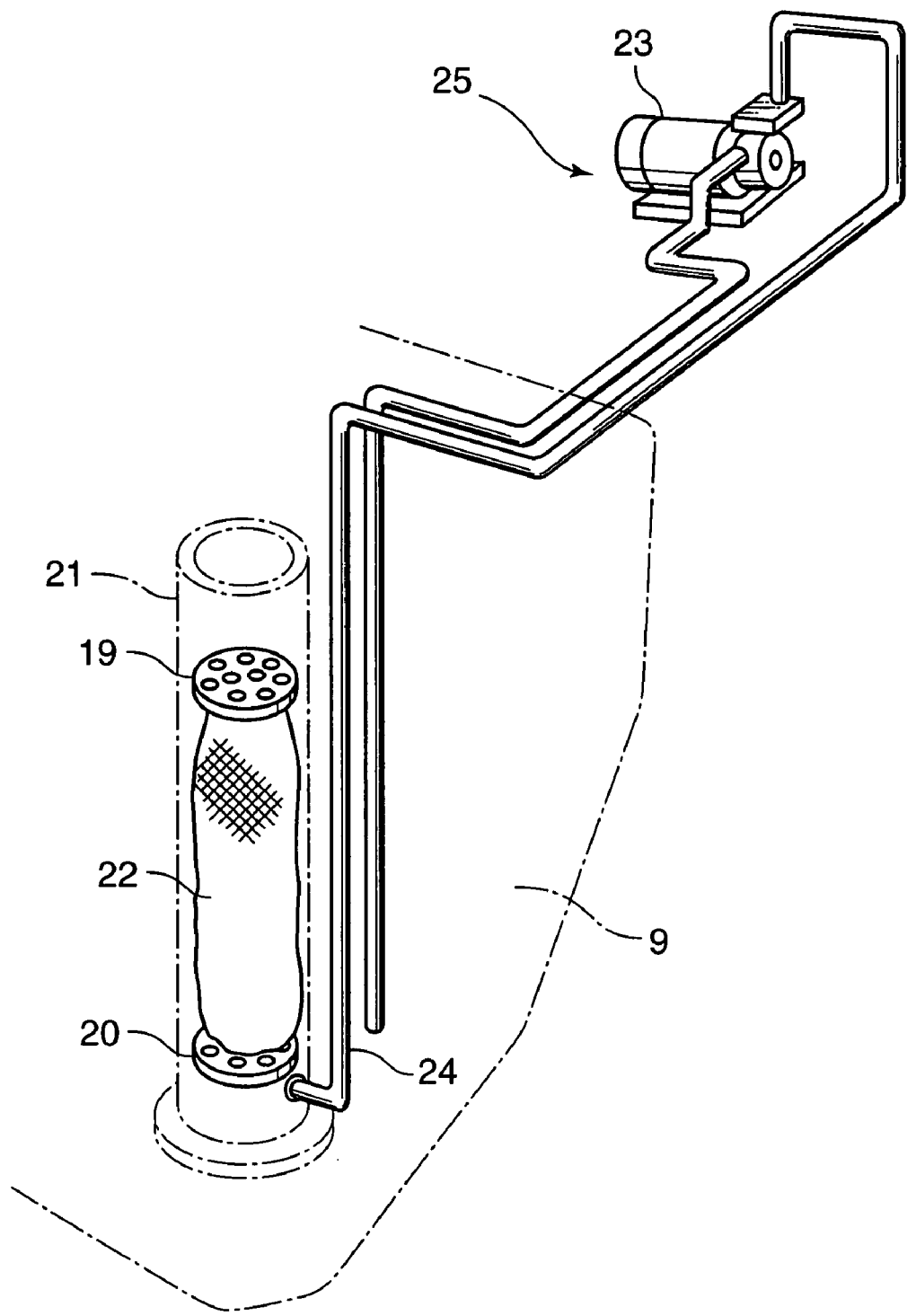
FIG. 5 is a perspective view showing an exemplified arrangement of circulating means provided in a downstream most treatment chamber.

As shown in FIG. 5, the purified wastewater storage chamber 9 has an adsorption column 21, with partition plates 19 and 20 each formed with a number of through-holes being arranged vertically spaced apart from each other, an activated carbon holder 22 disposed in the adsorption column 21 between the partition plates 19 and 20, and circulating means 25 with a circulation pump 23 for sucking the treated wastewater from the purified wastewater storage chamber 9 and pumping the treated wastewater onto a lower part of the activated carbon holder 22, and a circulation pipe 24. The activated carbon holder 22 is formed by packing a coal-based activated carbon in a bag made of fabric or the like. The treated wastewater pumped onto the lower part of the activated carbon holder 22 circulates within the purified wastewater storage chamber 9 through the adsorption column 21, whereby colored components in the treated wastewater are adsorbed by the coal-based activated carbon in the activated carbon holder 22 for decolorization.

As shown in FIG. 2, part of the purified wastewater which has been decolorized in the purified wastewater storage chamber 9 is supplied to a water supply tank (not shown) of the lavatory by water supply means 28 including a water supply pump 26 and a water supply pipe 27, and the remainder is transferred, via a conduit pipe 30, to the purified wastewater storage tank 2 for storage. The water supply pipe 27 is communicated with washing pipes 31, 32, and 33 for washing the inner walls of the treatment chambers 5, 6, 7, and 8 by supplying the purified wastewater in the purified wastewater storage chamber 9, as washing water, from upper parts of the first intermediate treatment chamber 5, the third intermediate treatment chamber 7, and the downstream most treatment chamber 8 into the treatment chambers 5 through 8, according to needs.

Figure 6:
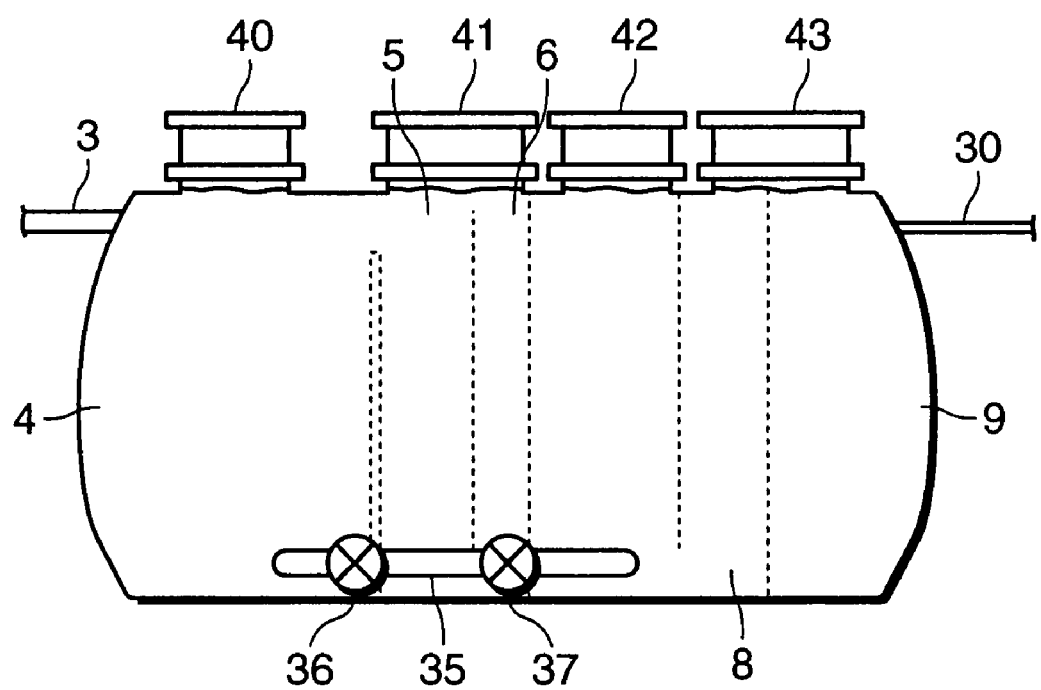
FIG. 6 is a front view showing an exemplified arrangement of a reflux channel.

As shown in FIGS. 2 and 6, the upstream most treatment chamber 4, the first and the third intermediate treatment chambers 5 and 7 located downstream of the upstream most treatment chamber 4, and the downstream most treatment chamber 8 are connected to each other via a reflux channel 35 formed in a lower part on a side wall of the wastewater treatment tank 1. A first on-off valve 36 and a second on-off valve 37 for opening and closing the reflux channel 35 are provided on the reflux channel 35. Opening the first on-off valve 36 disposed at the upstream position of the reflux channel 35 allows for communication between the upstream most treatment chamber 4, and the first and the second intermediate treatment chambers 5 and 6. Opening the downstream-side second on-off valve 37 while keeping the first on-off valve 36 in the opened state allows for communication between the upstream most treatment chamber 4, and the third intermediate treatment chamber 7 and the downstream most treatment chamber 8.

Opening parts 40, 41, 42, and 43 for cleaning or inspection are formed in upper parts of the upstream most treatment chamber 4, the first through the third intermediate treatment chambers 5, 6, 7, the downstream most treatment chamber 8, and the purified wastewater storage chamber 9. The opening part 40 formed in the upstream most treatment chamber 4 is used as a sucking port for receiving a suction hose of wastewater suction means. Closing lids (not shown) for openably closing the opening parts 40 through 43 in a normal operation state are provided. The wastewater purifying apparatus is further provided with purified wastewater supply means 47 including a water supply pump 45 and a water supply pipe 46 for washing the inner walls of the upstream most treatment chamber 4 by supplying the purified wastewater stored in a purified wastewater storage container comprised of the purified wastewater storage chamber 9 and the purified wastewater storage tank 2 into the upstream most treatment chamber 4, as washing water.

The wastewater purifying apparatus according to the embodiment of the invention comprises: the treatment chambers 4 through 8 for stepwise purifying wastewater discharged from a lavatory; the purified wastewater storage chamber 9 for storing purified wastewater derived from the downstream most treatment chamber 8 at the most downstream position of the treatment chambers 4 through 8; and the purified wastewater storage tank 2 for storing the purified wastewater derived from the purified wastewater storage chamber 9. With this arrangement, after the sludge components such as paper and large-sized foreign matters in the wastewater discharged from the lavatory through the drainage pipe 3 are sedimented in the upstream most treatment chamber 4 for separation, the purified wastewater can be transferred into the purified wastewater storage chamber 9 and the purified wastewater storage tank 2 for storage, with the sludge components in the treated wastewater transferred successively from the upstream most treatment chamber 4 into the first through the third intermediate treatment chambers 5 through 7, and into the downstream most treatment chamber 8 being stepwise purified by the microbial action or a like action of the microorganisms. Thus, the wastewater purifying apparatus is advantageously used by e.g. supplying the purified wastewater stored in the purified wastewater storage chamber 9 to the water supply tank of the lavatory by the water supply means 28.

The wastewater purifying apparatus has the opening part i.e. the suction port 40, which is formed in the upstream most treatment chamber 4 at the most upstream position of the wastewater purifying apparatus, for sucking the wastewater. The wastewater purifying apparatus further comprises: the reflux means including the reflux channel 35 along which the treated wastewater is refluxed from the first through the third intermediate treatment chambers 5 through 7 disposed downstream of the upstream most treatment chamber 4, and from the downstream most treatment chamber 8 into the upstream most treatment chamber; and the purified wastewater supply means 47 for supplying the purified wastewater stored in the purified wastewater storage container comprised of the purified wastewater storage chamber 9 and the purified wastewater storage tank 2 into the upstream most treatment chamber 4. With this arrangement, inserting the suction hose of the wastewater suction means provided in a honey wagon or a like vehicle into the opening part 40 of the upstream most treatment chamber 4, and sucking the wastewater from the upstream most treatment chamber 4 enables to successively drain the wastewater and the treated wastewater from the treatment chambers 4 through 9 outside, and thereafter wash the inner walls of the treatment chambers.

Specifically, continuing an operation of draining the wastewater from the upstream most treatment chamber 4 by the wastewater suction means, followed by suction of the treated wastewater from the upstream most treatment chamber 4 for drainage, with the first and the second on-off valves 36 and 37 i.e. opening/closing means provided on the reflux channel 35 being brought into an opened state one after the other, enables to successively drain the treated wastewater which has been refluxed from the first to the third intermediate treatment chambers 5 through 7 and from the downstream most treatment chamber 8 into the upstream most treatment chamber 4 via the reflux channel 35. Also, the upstream most treatment chamber 4 and the first and the second intermediate treatment chambers 5 and 6 can be filled with the washing water i.e. the purified wastewater, with the washing water supplied by the purified wastewater supply means 47 being used to remove the sludge components and the like adhered to the inner walls of the upstream most treatment chamber 4.

The above arrangement enables to expediently and easily drain the interior of the treatment chambers 4 through 8, without cumbersome operations of inserting the suction hose into the opening parts 40 through 43 formed in the upper end parts of the treatment chambers 4 through 8 one after another, and individually draining the wastewater or the treated wastewater from the treatment chambers 4 through 8. Accordingly, at the time of holding an event such as an outdoor concert or occurrence of a disaster or a like incident, the wastewater purifying apparatus can be easily and properly cleared after its temporary installation at a predetermined site.

Also, in the case where the wastewater purifying apparatus for a public lavatory, which is installed at a predetermined fixed site such as a park, undergoes periodical inspection, maintenance service, or the like, this arrangement is advantageously used in facilitating the inspection, the maintenance service, or the like by draining the interiors of the treatment chambers 4 through 8 and by washing the interiors of the treatment chambers 4 through 8 provided in the wastewater treatment tank 1. It is desirable to set the capacity of the purified wastewater storage tank 2 substantially equal to the total capacity of the upstream most treatment chamber 4, and the first and the second intermediate treatment chambers 5 and 6 to fill the upstream most treatment chamber 4, and the first and the second intermediate treatment chambers 5 and 6 with the purified wastewater after the drainage of the wastewater and the treated wastewater.

In this embodiment, the wastewater purifying apparatus comprises the purified wastewater supply means including the water supply means 28 with the washing pipes 31 through 33 along which the purified wastewater stored in the purified wastewater storage chamber 9 in the wastewater treatment tank 1 is supplied, as the washing water, from the upper parts of the first and the third intermediate treatment chambers 5 and 7 and of the downstream most treatment chamber 8, respectively. With this arrangement, in successively draining the treated wastewater from the first through the third intermediate treatment chambers 5 through 7 and from the downstream most treatment chamber 8 after refluxing the treated wastewater into the upstream most treatment chamber 4, the sludge components and the like adhered to the inner walls of the treatment chambers 5 through 8 can be effectively removed by the washing water supplied by the purified wastewater supply means.

In the embodiment, shell such as oyster shell, of which at least the mother-of-pearl layer "b" as the inner layer is removed and the porous prismatic layer "c" is exposed, is used, as the shell/coral-based contact member 15 loaded in the third intermediate treatment chamber 7 of the wastewater purifying apparatus. This enables to increase an affinity of the shell/coral-based contact member 15 to microorganisms decomposing the sludge components in the wastewater introduced into the third intermediate treatment chamber 7 to thereby propagate the microorganisms adequately. In other words, with use of the microorganisms propagated on the surface of the porous prismatic layer "c", the sludge components in the treated wastewater can be effectively decomposed, and the wastewater can be purified efficiently. The use of the shell/coral-based contact member 15 has an additional advantage in that the microorganisms are allowed to exhibit their decomposition function or a like function from the beginning of operation after installation of the wastewater purifying apparatus. This enables to effectively prevent possible environmental pollution which may occur during a start-up period when the purified wastewater treated by the wastewater purifying apparatus is discharged outside, and to utilize water resources more efficiently by reutilizing the purified wastewater as flushing water of the lavatory.

Additionally, when the treated wastewater is acidified as a result of aeration of the wastewater in the first intermediate treatment chamber 5 and the third intermediate treatment chamber 7, calcium carbonate ($CaCO_2$) in the shell/coral is expediently dissolved in the treated wastewater, thereby neutralizing the treated wastewater. In other words, the shell of which the mother-of-pearl layer "b" is removed has an advantage in that it can neutralize the acidified treated wastewater more efficiently due to its higher tendency to be dissolved in the wastewater.

Since the treated wastewater is neutralized in the third intermediate treatment chamber 7 as described above, protozoa such as heliozoa and coelenterates can be developed and proliferated in large quantity. Therefore, by extinguishing bacteria such as *Escherichia coli* present in the treated wastewater through predation by the protozoa and the like, bacterial contamination into the purified wastewater discharged from the wastewater purifying apparatus can be effectively prevented.

Further, when the treated wastewater contains phosphorus components, the treated wastewater can be expediently neutralized to yield calcium phosphate ($Ca(OH)(PO_4)_3$) by effectively reacting the Ca ion dissociated from the calcium carbonate with the phosphor ion ($HPO_4$) in the treated wastewater. The use of the shell/coral-based contact member 15 has an additional advantage in that the calcium phosphate ($Ca(OH)(PO_4)_3$) thus formed is adsorbed on the activated carbon in the activated carbon holder 22 loaded in the purified wastewater storage chamber 9, and recovered for use as a fertilizer or the like (see the following reaction formula).

$$5Ca+3HPO_4 \rightarrow Ca(OH)(PO_4)_3+3H_2O$$

Meanwhile, part of the calcium phosphate ($Ca(OH)(PO_4)_3$) in the treated wastewater precipitates in the downstream most treatment chamber 8, and is adsorbed on the filter member 17, while the remainder is adsorbed on the activated carbon in the activated carbon adsorption holder 22. For the purpose of removing a minute amount of the phosphorus components which remain in the treated wastewater, it is desirable to place an additional phosphorus adsorption column packed with shells such as oyster shells in the activated carbon adsorption holder 22.

In the embodiment, the circulating means 25 as shown in FIG. 5 is provided to suck the treated wastewater from the purified wastewater storage chamber 9 for pumping onto the lower part of the activated carbon holder 22 so as to circulate the treated wastewater in the purified wastewater storage chamber 9. This is advantageous in effectively adsorbing the pigment components in the treated wastewater on the coal-based activated carbon in the activated carbon holder 22 for improved decolorization.

Also, in the embodiment, the wastewater purifying apparatus comprises the first intermediate treatment chamber 5, at the upstream of the third intermediate treatment chamber 7, which is loaded with the plastic contact member 11; and the second intermediate treatment chamber 6, with the sedimentation chamber, where the impurities and the like in the treated wastewater derived from the first intermediate treatment chamber 5 are sedimented to transfer the wastewater, whose purification has been completed to some extent, to the third intermediate treatment chamber 7. This is advantageous in effectively suppressing lowering of the purification performance of the shells such as oyster shells loaded in the third intermediate treatment chamber 7 at an early stage of installation, or disappearance of the shells by dissolution.

The embodiment describes the arrangement that the purified wastewater storage tank 2 is provided independently of the purified wastewater storage chamber 9 at the most downstream position of the wastewater treatment tank 1 so that the purified wastewater derived from the purified wastewater storage chamber 9 via the conduit pipe 30 is stored in the purified wastewater storage tank 2. Alternatively, the purified wastewater storage chamber 9 may be integrally formed with the purified wastewater storage tank 2 by communicating the purified wastewater storage chamber 9 and the purified wastewater storage tank 2 with each other. Further alternatively, the purified wastewater storage tank 2 may be omitted by increasing the capacity of the purified wastewater storage chamber 9.

Alternatively, the wastewater purifying apparatus may comprise purified wastewater supply means for supplying the purified wastewater stored in the purified wastewater storage chamber 9 into the upstream most treatment chamber 4, and purified wastewater supply means for supplying the purified wastewater stored in the purified wastewater storage tank 2 into the first and the third intermediate treatment chambers 5 and 7 and into the downstream most treatment chamber 8, in place of the arrangement that the wastewater purifying apparatus comprises the purified wastewater supply means 47 for supplying the purified wastewater stored in the purified wastewater storage tank 2 into the upstream most treatment chamber 4, and the water supply means 28 including the washing pipes 31 through 33 through which the purified wastewater stored in the purified wastewater storage chamber 9 is supplied, as the washing water, into the first and the third intermediate treatment chambers 5 and 7, and into the downstream most treatment chamber 8.

Further alternatively, the wastewater purifying apparatus may comprise a treated wastewater feeding pump or an airlift i.e. transferring means utilizing compressed air to forcibly reflux the treated wastewater into the upstream most treatment chamber 4, in place of providing the reflux means including the reflux channel 35 through which the treated wastewater is refluxed from the first and the third intermediate treatment chambers 5 and 7 into the upstream most treatment chamber 4.

Figure 7:
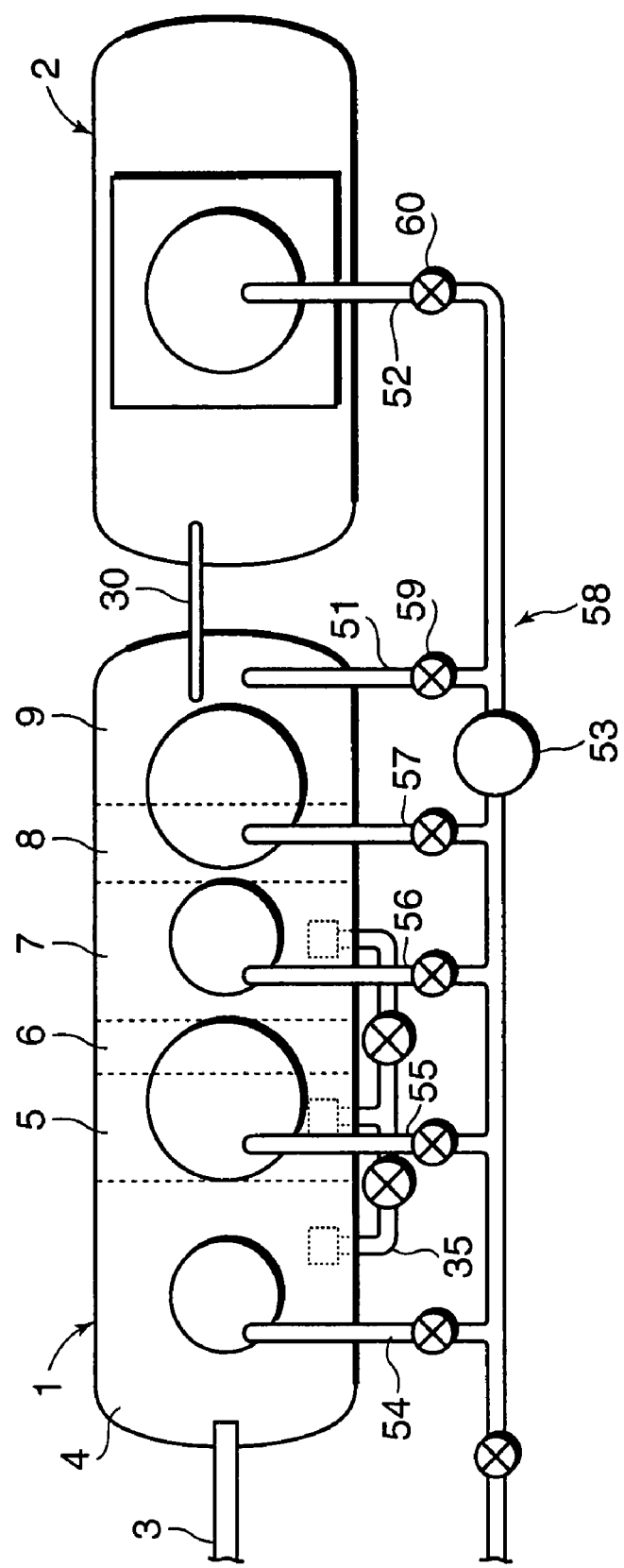
FIG. 7 is a plan view showing a wastewater purifying apparatus as a modified embodiment of the invention.

Alternatively, as shown in FIG. 7, the wastewater purifying apparatus may comprise purified wastewater supply means 58 including: a first suction pipe 51 for sucking the purified wastewater stored in the purified wastewater storage chamber 9; a second suction pipe 52 for sucking the purified wastewater stored in the purified wastewater storage tank 2; a water supply pump 53 arranged upstream with respect to a junction of the suction pipes 51 and 52; and washing pipes 54, 55, 56, and 57 through which the washing water is supplied into the treatment chambers 4 through 8. The wastewater purifying apparatus may be constructed in such a manner that the purified wastewater in the purified wastewater storage chamber 9 or the purified wastewater storage tank 2 is sucked for selective supply into the treatment chambers 4 through 8, by actuating the water supply pump 53, while closing one of on-off valves 59 and 60 provided on the suction pipes 51 and 52, and opening the other one thereof, to sequentially transfer the sludge components and the like adhered to the inner walls of the treatment chambers 4 through 8. Also, the purified wastewater can be effectively utilized by supplying the purified wastewater in the purified wastewater storage chamber 9 or the purified wastewater storage tank 2 into the water supply tank of the lavatory by the purified wastewater supply means 58, while keeping on-off valves provided at the washing pipes 54 through 57 in a closed state according to needs.

Figure 8:
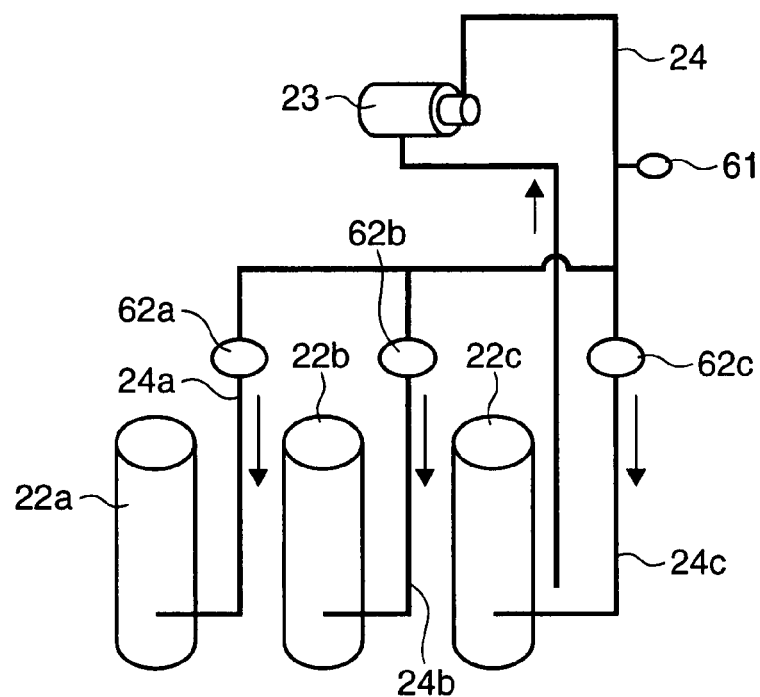
FIG. 8 is a diagram showing an installation example of an activated carbon holder.

As shown in FIG. 8, a plurality of activated carbon holders 22a, 22b, and 22c may be arranged in the purified wastewater storage chamber 9 at the most downstream position of the wastewater treatment tank 1; manifold pipes 24a, 24b, and 24c may be provided to pump the treated wastewater onto lower parts of the activated carbon holders 22a, 22b, and 22c by actuating a circulation pump 23; and the activated carbon holder for use may be selectively switched over among the activated carbon holders 22a through 22c by controlling opening/closing of automatic on-off valves 62a, 62b, and 62c provided at the manifold pipes 24a, 24b, and 24c in accordance with a pressure detected by a pressure gauge 61 provided at the circulation pipe 24 disposed at an upstream position of the manifold pipes 24a, 24b, and 24c.

Specifically, the treated wastewater is supplied to the first activated carbon holder 22a by actuating the circulation pump 23, with the automatic on-off valve 62a at the manifold pipe 24a in an opened-state and the automatic on-off valves 62b and 62c in a closed-state, and by detecting the pressure of the treated wastewater to be supplied by the pressure gauge 61. If the processing performance of the first activated carbon holder 22a is degraded due to clogging or a like phenomenon of the first activated carbon holder 22a, the pressure detected by the pressure gauge 61 is increased. Controlling the opening/closing of the automatic on-off valves 62a, 62b, and 62c depending on the detection result of the pressure gauge 61 enables to switch over the activated carbon holder for use among the activated carbon holders 22a, 22b, and 22c one after another. This is advantageous in properly setting the useful period and the frequency of use of the activated carbon holders 22a, 22b, and 22c, which enables to lower the running cost of the apparatus.

Figure 9:
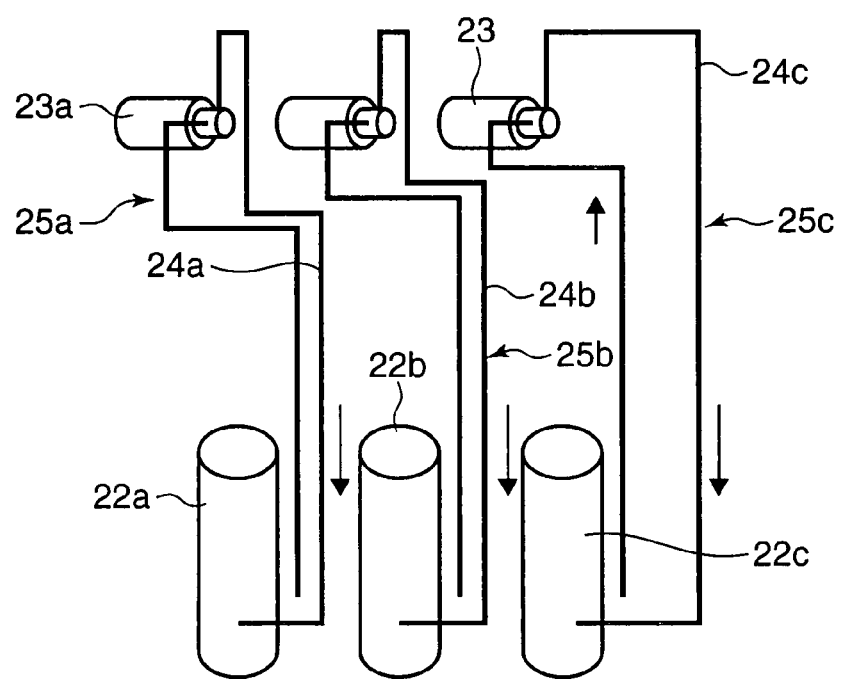
FIG. 9 is a diagram showing another installation example of the activated carbon holder.

Alternatively, in addition to the arrangement that the activated carbon holders 22a, 22b, and 22c are arranged in the purified wastewater storage chamber 9, as shown in FIG. 9, circulating means 25a, 25b, and 25c respectively including circulation pumps 23a, 23b, and 23c and circulation pipes 24a, 24b, and 24c for supplying the treated wastewater onto the lower parts of the activated carbon holders 22a, 22b, and 22c for circulation may be provided individually. Further alternatively, a single circulation pump (not shown) having a sufficiently large capacity may be provided to simultaneously supply the treated wastewater onto the lower parts of the activated carbon holders 22a, 22b, and 22c.

Figure 10:
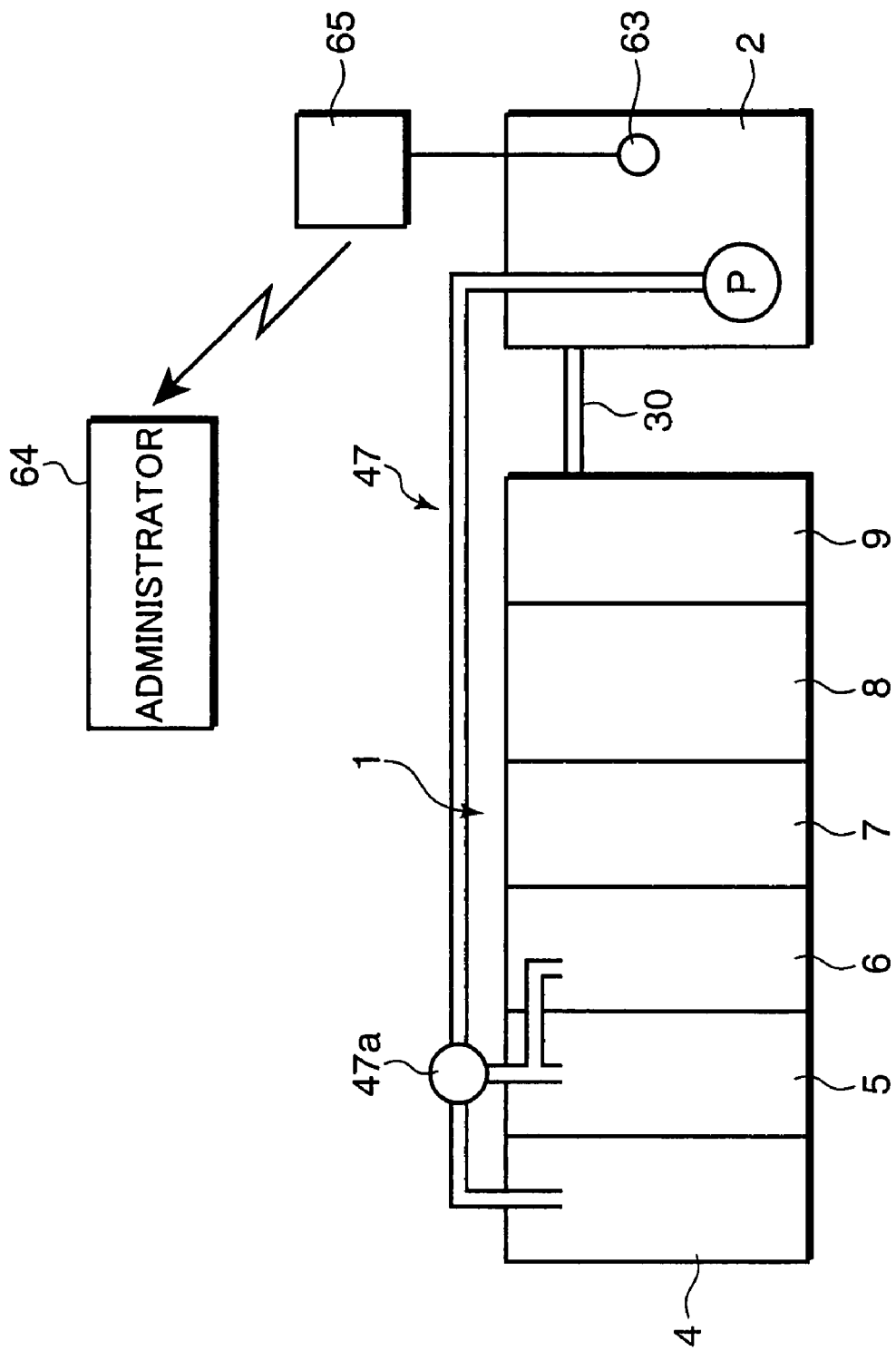
FIG. 10 is a plan view showing a wastewater purifying apparatus as yet another modified embodiment of the invention.

Alternatively, as shown in FIG. 10, the wastewater purifying apparatus may comprise abnormality detecting means 63 for detecting an abnormality of the purified wastewater stored in the purified wastewater storage tank 2, in other words, detecting whether the amount of the purified wastewater stored in the purified wastewater storage tank 2 is equal to or larger than a predetermined reference value, which means that the storage tank 2 is full, or whether one of parameters i.e. pH, color degree (turbidity), and residual chlorine concentration is over or under respective corresponding reference values due to deterioration of the quality of the purified wastewater stored in the purified wastewater storage tank 2; and transmitting means 65 for transmitting an abnormality detection signal to an administrator 64 if the abnormality detecting means 63 detects the abnormality. With this arrangement, in the case where the wastewater purification functions of the treatment chambers 4 through 8 provided in the wastewater treatment tank 1 deteriorate, or the wastewater purification functions of the treatment chambers 4 through 8 are deficient because an exceedingly large amount of wastewater is temporarily introduced into the wastewater treatment tank 1 or a like condition, the abnormality detecting means 63 outputs an abnormality detection signal to the administrator 64 to properly notify a person in charge of the apparatus of the need of inspection, maintenance service, and the like.

Figure 11:
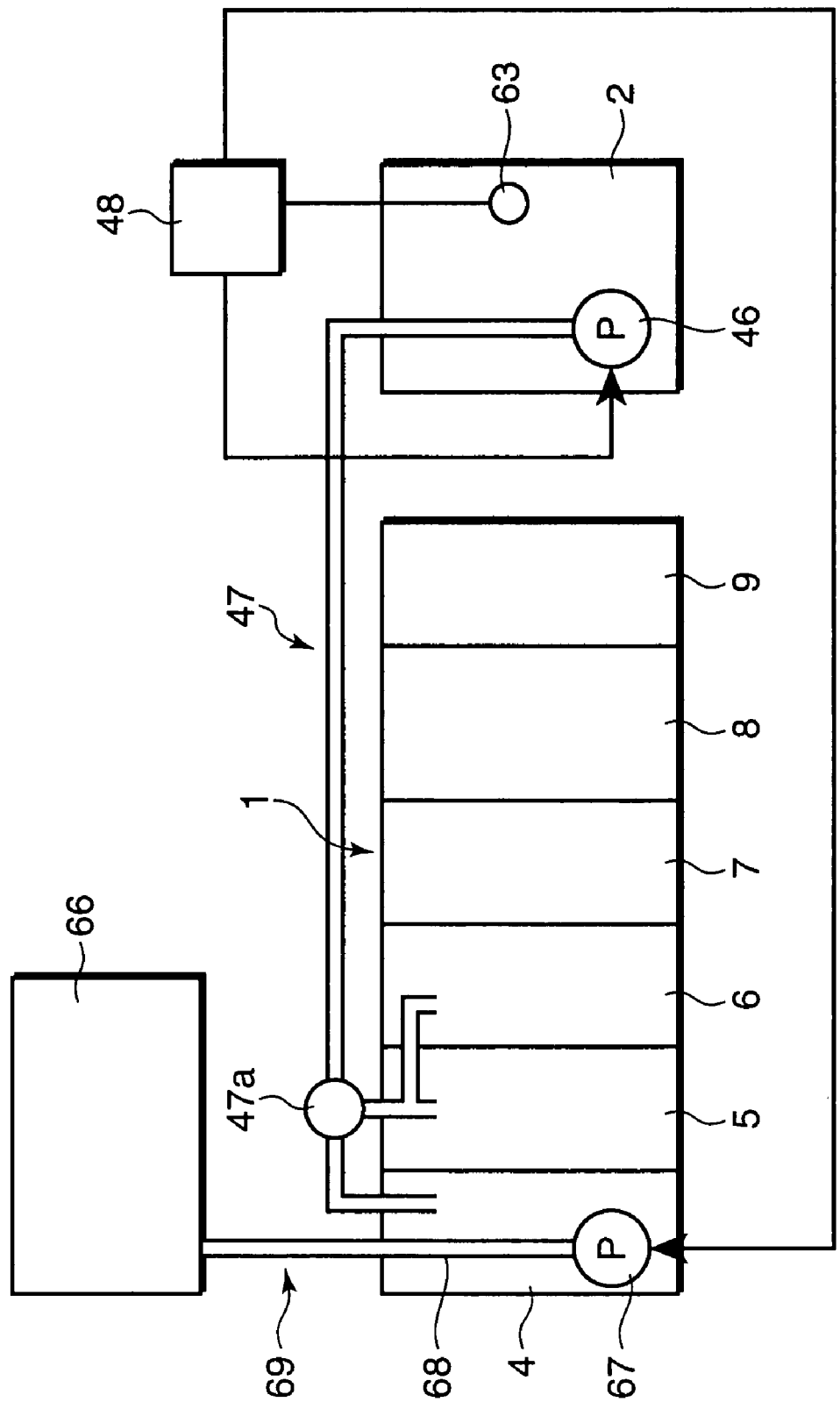
FIG. 11 is a plan view showing a wastewater purifying apparatus as a further modified embodiment of the invention.

Alternatively, as shown in FIG. 11, a wastewater storage tank 66 may be arranged parallel to the upstream most treatment chamber 4 in the wastewater treatment tank 1; and transferring means 69 including a feeding pump 67 and a feeding pipe 68 for transferring the wastewater from the upstream most treatment chamber 4 into the wastewater storage tank 66 may be provided to transfer the wastewater from the upstream most treatment chamber 4 into the wastewater storage tank 66 according to needs.

For instance, in the case where occurrence of abnormality of the purified wastewater in the purified wastewater storage tank 2 such as a full condition of the purified wastewater storage tank 2, or deterioration of the quality of the purified wastewater due to inflow of an exceedingly large amount of wastewater into the upstream most treatment chamber 4 is detected in accordance with a detection signal of the abnormality detecting means 63 for detecting an abnormality of the purified wastewater stored in the purified wastewater storage tank 2, in response to output of an actuation command signal from controlling means 48 to the feeding pump 67 to actuate the feeding pump 67, the wastewater is transferred from the upstream most treatment chamber 4 into the wastewater storage tank 66. Thereafter, in response to output of an actuation command signal from the controlling means 48 to the feeding pump 46 of the purified wastewater supply means 45 to actuate the feeding pump 46, the purified wastewater is transferred from the purified wastewater storage tank 2 into the upstream most treatment chamber 4 or a like chamber in the wastewater treatment tank 1. In FIGS. 10 and 11, the reference numeral 47a denotes a three-way switching valve for switching over a direction of supplying the purified wastewater among the treatment chambers 4, 5, and 6 by the purified wastewater supply means 47.

As shown in FIG. 11, in the case where the wastewater storage tank 66 is provided parallel to the upstream most treatment chamber 4 of the wastewater treatment tank 1 to transfer the wastewater from the upstream most treatment chamber 4 into the wastewater storage tank 66 by the transferring means 69, the suction of the wastewater and the drainage of the wastewater i.e. two operations can be executed simultaneously. This enables to extend the cycle of performing inspection, maintenance service, and the like of the wastewater treatment tank 1 about twice as long as the conventional arrangement. This is advantageous in reducing the number of times of performing the inspection, the maintenance service, and the like of the wastewater treatment tank 1. Alternatively, the wastewater may be transferred from the upstream most treatment chamber 4 into the wastewater storage tank 66 by overflow, in place of the modified embodiment that the wastewater is forcibly transferred from the upstream most treatment chamber 4 into the wastewater storage tank 66 by the feeding pump 67.

Figure 12:
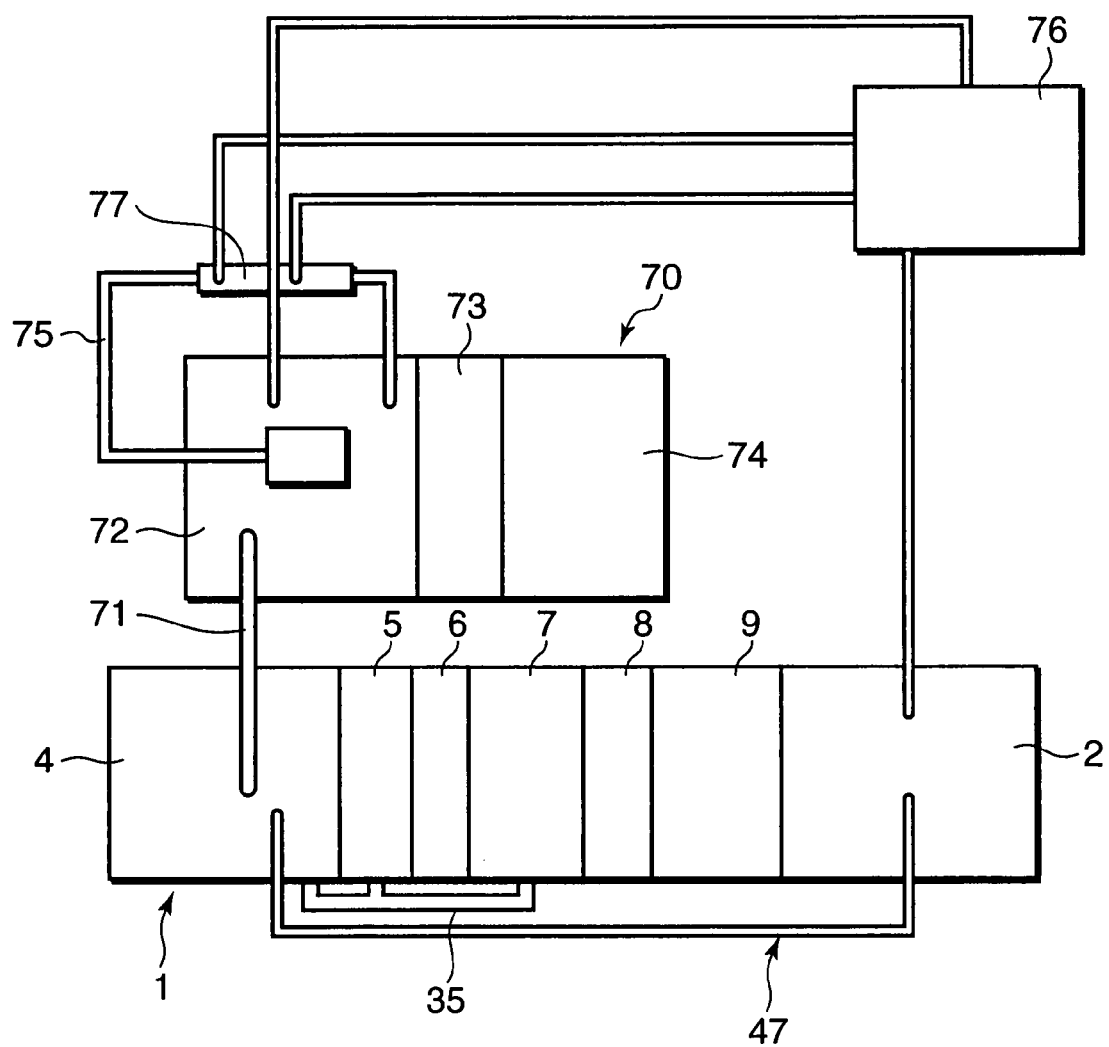
FIG. 12 is a plan view showing a wastewater purifying apparatus as a still further modified embodiment of the invention.

Alternatively, as shown in FIG. 12, the wastewater purifying apparatus may comprise: treatment chambers 4 through 8 for stepwise purifying wastewater containing sludge components such as sewage discharged from a lavatory, or miscellaneous effluents generated by pulverizing garbage by a disposer; a wastewater treatment tank 1 including a purified wastewater storage chamber 9 for storing purified wastewater derived from the downstream most treatment chamber 8 at the most downstream position of the treatment chambers; a purified wastewater storage tank 2 communicated with the wastewater treatment tank 1 at the most downstream position thereof; a sludge treatment tank 70 arranged parallel to the upstream most treatment chamber 4 at the most upstream position of the wastewater treatment tank 1; and transferring means 71 including a feeding pipe for transferring the wastewater from the upstream most treatment chamber 4 into the sludge treatment tank 70. The sludge treatment tank 70 has an anaerobic decomposition chamber 72 for allowing the sludge components in the wastewater transferred to the sludge treatment tank 70 by the transferring means 71 to undergo anaerobic decomposition; an aerobic decomposition chamber 73 for allowing the treated wastewater derived from the anaerobic decomposition chamber 72 to undergo aerobic decomposition; and a sedimentation/separation chamber 74 for sedimenting the treated wastewater derived from the aerobic decomposition chamber 73 for separation.

The anaerobic decomposition chamber 72 contains therein methane bacteria capable of generating methane gas by decomposing organic substances constituting the sludge components in the wastewater which has been transferred from the upstream most treatment chamber 4 by overflow or forcible transfer by the transferring means 71 under an anaerobic condition. The aerobic decomposition chamber 73 contains therein aerobic bacteria capable of decomposing residual organic components, biologically nitrifying ammonia components, or performing an equivalent action within the treated wastewater derived from the anaerobic decomposition chamber 72. After the treated wastewater has undergone the decomposition in the aerobic decomposition chamber 73, the treated wastewater is transferred into the sedimentation/separation chamber 74 for sedimentation. Thereafter, the treated wastewater is reutilized by showering or sprinkling the treated wastewater, or as water for fire extinguishing, or for other purpose.

The anaerobic decomposition chamber 72 is provided with a circulation pipe 75 for circulating part of the wastewater introduced into the anaerobic decomposition chamber 72. The circulation pipe 75 has heating means including a heater 77 for increasing the temperature of the interior of the anaerobic decomposition chamber 72 to a temperature zone ranging from about 35° C. to 37° C., which is suitable for medium temperature fermentation by methane fermentation bacteria, or to a temperature zone ranging from about 53° C. to 56° C., which is suitable for high temperature fermentation by methane fermentation bacteria, while promoting decomposition of fibers and horns in the sludge components, by heating the sludge components in the wastewater which is circulated in the circulation pipe 75 to 70° C. or higher, with use of waste heat or vapor supplied from a boiler 76. The boiler 76 is constructed in such a manner that vapor is generated by heating the purified wastewater in the purified wastewater storage tank 2, using the methane gas generated in the anaerobic decomposition chamber 72, as a fuel.

In the above arrangement, the sludge components in the wastewater transferred from the upstream most treatment chamber 4 to the sludge treatment tank 70 by the transferring means 71 can be efficiently decomposed by stepwise purifying the sludge components in the anaerobic decomposition chamber 72, the aerobic decomposition chamber 73, and in the sedimentation/separation chamber 74. This enables to facilitate purification treatment even if wastewater of an amount exceeding the processing performance of the wastewater treatment tank 1 is supplied. Also, this arrangement enables to reduce the number of times of performing inspection, maintenance service, and the like of the wastewater treatment tank 1. Further, this arrangement is advantageous in effectively utilizing bio-gas such as methane gas generated in the anaerobic decomposition chamber 72, as a fuel for the boiler 76 or an equivalent device.

In the above modified embodiment, the wastewater purifying apparatus comprises the heating means 77 for accelerating decomposition of fibers and horns in the sludge components by heating the sludge components in the wastewater transferred to the anaerobic decomposition chamber 72 of the sludge treatment tank 70 by the transferring means 71 to 70° C. or higher. This enables to accelerate the decomposition of fibers and horns by heating the sludge components in the wastewater transferred to the anaerobic decomposition chamber of the sludge treatment tank 70 to a predetermined temperature, and to effectively purify the wastewater by heating the interior of the anaerobic decomposition chamber to a temperature suitable for methane bacteria fermentation.

Figure 13:
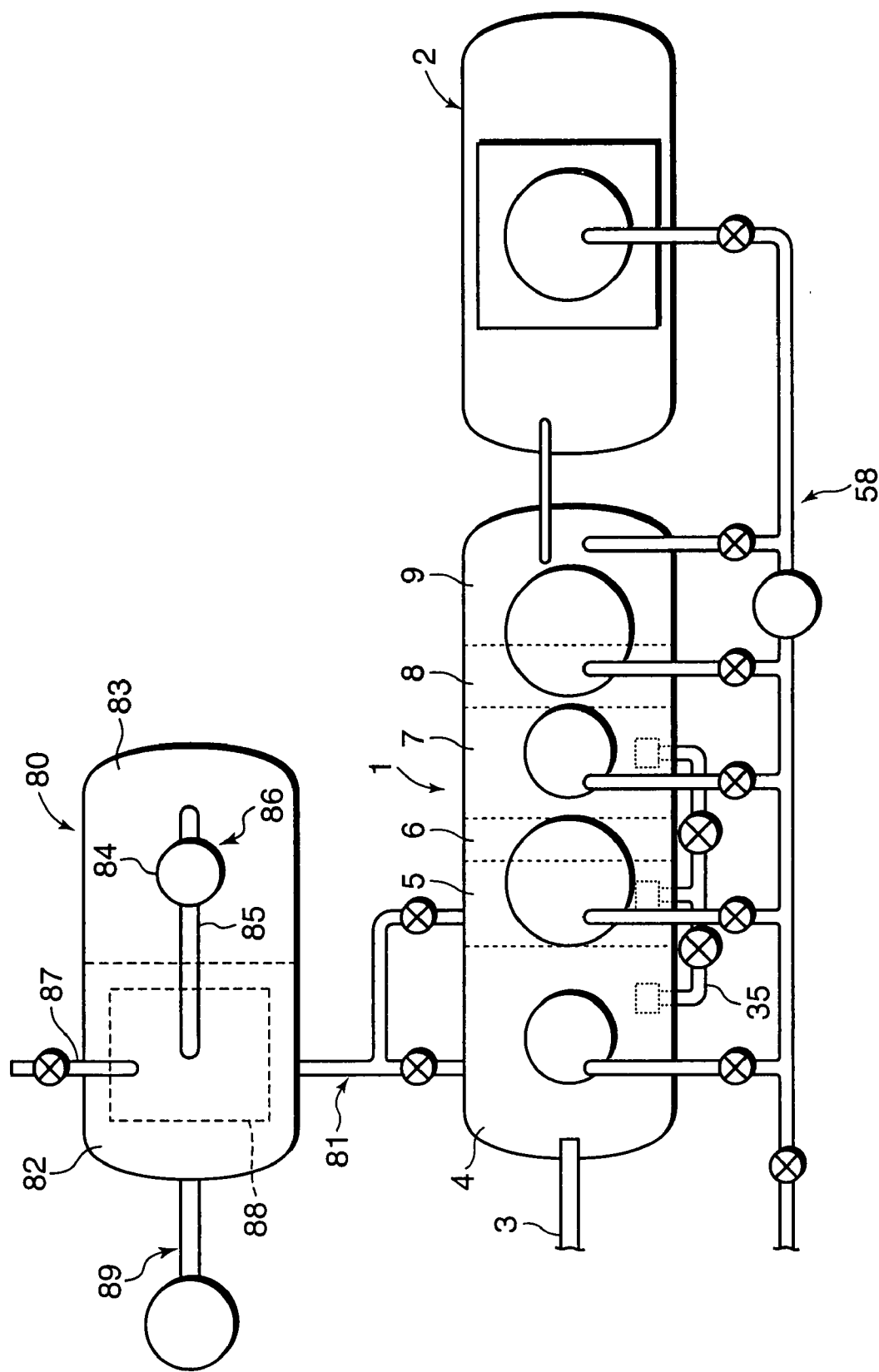
FIG. 13 is a plan view showing a wastewater purifying apparatus as still another modified embodiment of the invention.

Alternatively, as shown in FIG. 13, the wastewater purifying apparatus may comprise: a wastewater treatment tank 1 for stepwise purifying wastewater containing sludge components such as sewage discharged from a lavatory through a drainage pipe 3, and miscellaneous effluents generated by pulverizing garbage by a disposer; a purified wastewater storage tank 2 communicated with the wastewater treatment tank 1 at a most downstream position thereof; a sludge treatment tank 80 arranged parallel to the wastewater treatment tank 1; and transferring means 81 for transferring the wastewater from treatment chambers 4 and 5 at an upstream position of the wastewater treatment tank 1 into the sludge treatment tank 80, wherein the sludge components in the wastewater transferred by the transferring means 81 are decomposed in the sludge treatment tank 80.

Similarly to the embodiment/modification shown in FIGS. 2 and 7, for instance, the aforementioned wastewater treatment tank 1 includes the upstream most treatment chamber 4 with a sedimentation/separation chamber, which is disposed on the most upstream position of the wastewater treatment tank 1; the first intermediate treatment chamber 5 with a contact aeration chamber, which is disposed downstream of the upstream most treatment chamber 4; a second intermediate treatment chamber 6 with a sedimentation chamber, which is disposed downstream of the first intermediate treatment chamber 5; a third intermediate treatment chamber 7 with a contact filtration chamber, which is disposed downstream of the second intermediate treatment chamber 6; a downstream most treatment chamber 8 with a sedimentation/filtration chamber, which is disposed on the most downstream position of the treatment chambers 4 through 8; a purified wastewater storage chamber 9 for storing the treated wastewater derived from the downstream most treatment chamber 8 while performing decolorization. The wastewater treatment tank 1 is connected with water supply means 58 for selectively supplying the purified wastewater into the treatment chambers 4 through 8 by suction of the purified wastewater from the purified wastewater storage chamber 9 and the purified wastewater storage tank 2, and for supplying the purified wastewater to a water supply tank of the lavatory according to needs.

Further, the sludge treatment tank 80 has a decomposition chamber 82 for decomposing the sludge components in the wastewater transferred from the upstream most treatment chamber 4 i.e. the sedimentation/separation chamber, or the first intermediate treatment chamber 5 i.e. the contact aeration chamber by the transferring means 81; a wastewater storage chamber 83 for storing the wastewater derived from the decomposition chamber 82; reflux means 86 including a feeding pump 84 and a reflux pipe 85 for refluxing the wastewater stored in the wastewater storage chamber 83 into the decomposition chamber 82 according to needs; and an exhaust pipe 87 for exhausting gas components generated in the decomposition chamber 82 by decomposition of the sludge components.

The decomposition chamber 82 is loaded with a contact member 88 constituted of a wooden material such as cedar chips or sawdust, or a plastic material. The decomposition chamber 82 is constructed in such a manner that a gas generated by decomposition of the sludge components, using the microorganisms adhered to the contact member 88 is allowed to emit into the ambient air through the exhaust pipe 87. Specifically, warm air or ambient air supplied from blower means 89 is introduced into the decomposition chamber 82, where the microbial activity of the aerobic microorganisms adhered to the contact member 88 is increased, with the result that the microorganisms eat organic substances, nitrogen compounds, or a like substance in the sludge components. As a result of the microbial activity of the microorganisms, part of the sludge components is eaten by the microorganisms, and the remainder is decomposed into harmless gas components such as ammonia ($NH_3$), nitrogen ($N_2$), carbon dioxide ($CO_2$), and water vapor ($H_2O$), which, in turn, are emitted into the ambient air through the exhaust pipe 87.

The decomposition chamber 82 is provided with the blower means 89 for selectively supplying warm air of a temperature of about 70° C., which is derived from a heat generating source such as a boiler, and the ambient air of a normal temperature. The wastewater purifying apparatus is controlled in such a manner that: at an initial stage of decomposing and digesting the sludge components in the wastewater transferred to the sludge treatment tank 80 by the transferring means 81, with use of the microbial activity of the microorganisms, warm air of a predetermined temperature is supplied into the decomposition chamber 82 by the blower means 89 to heat the interior of the decomposition chamber 82 to a temperature of about 53° C. to 56° C., whereby the microbial activity of the microorganisms is increased; and when the decomposition and digestion of the sludge components by the microorganisms is started, and the interior temperature of the decomposition chamber 82 is increased resulting from the decomposition heat or a like heat, the ambient air of a normal temperature is supplied into the decomposition chamber 82 by the blower means 89 to increase the microbial activity of the aerobic microorganisms, thereby accelerating the decomposition and digestion of the sludge components.

As the sludge components in the decomposition chamber 82 are consumed in accordance with the accelerated microbial activity of the microorganisms, the wastewater stored in the wastewater storage chamber 83 is refluxed into the decomposition chamber 82 by the reflux means 86. The amount of wastewater for reflux is preferably controlled to such a value as to effectively accelerate the microbial activity of the microorganisms without applying an excessive load to the microorganisms decomposing and digesting the sludge components.

In the above arrangement, the sludge components in the wastewater transferred from the treatment chambers 4 and 5 at the upstream position of the wastewater treatment tank 1 into the sludge treatment tank 80 by the transferring means 81 can be completely decomposed in the sludge treatment tank 80. This is advantageous in properly decomposing the wastewater without the need of providing means for incinerating residual sludge in the sludge treatment tank 80, releasing the wastewater after the decomposition, scooping out the residual sludge, or performing a like operation. This is also advantageous in reducing the number of times of performing the inspection, and the maintenance service and the like because the cycle of conducting the inspection, the maintenance service, and the like of the wastewater treatment tank 1 can be remarkably extended.

In the modified embodiment shown in FIG. 13, there is no need of providing the purified wastewater storage tank 2 at the most downstream position of the wastewater treatment tank 1 independently of the wastewater treatment tank 1. The purified wastewater storage chamber 9 and the purified wastewater storage tank 2 may be formed into an integral container by communicating the purified wastewater storage chamber 9 and the purified wastewater storage tank 2 with each other, or the purified wastewater storage tank 2 may be omitted by increasing the capacity of the purified wastewater storage chamber 9.

As described above, a wastewater purifying apparatus is provided with a plurality of treatment chambers for stepwise purifying wastewater containing sludge components such as sewage discharged from a lavatory, and a purified wastewater storage container for storing purified wastewater derived from a downstream most treatment chamber at a most downstream position of the treatment chambers. The apparatus comprises: a suction port formed in an upstream most treatment chamber at a most upstream position of the treatment chambers for sucking the wastewater; reflux means for refluxing treated wastewater from the treatment chamber at a downstream position of the upstream most treatment chamber into the upstream most treatment chamber; and purified wastewater supply means for supplying the purified wastewater stored in the purified wastewater storage container into the upstream most treatment chamber. In this arrangement, in performing maintenance service or the like for the wastewater purifying apparatus, the wastewater in the wastewater purifying apparatus is sucked by inserting a suction hose or a like device of wastewater suction means into the suction port of the upstream most treatment chamber, so that the wastewater in the upstream most treatment chamber is successively drained. Meanwhile, the treated wastewater in the treatment chambers comprised of the intermediate treatment chamber (s) and the downstream most treatment chamber is sucked by refluxing the treated wastewater into the upstream most treatment chamber by the reflux means, so that the treated wastewater is successively drained. Also, the sludge components and the like adhered to the inner walls of the upstream most treatment chamber can be effectively washed by the purified wastewater, as washing water, which is supplied into the upstream most treatment chamber by the purified wastewater supply means.

Another wastewater purifying apparatus is provided with a plurality of treatment chambers for stepwise purifying wastewater containing sludge components such as sewage discharged from a lavatory, and a purified wastewater storage container for storing purified wastewater derived from a downstream most treatment chamber at a most downstream position of the treatment chambers. The apparatus comprises: a sludge treatment tank arranged parallel to an upstream most treatment chamber at a most upstream position of the treatment chambers; and transferring means for transferring the wastewater from the upstream most treatment chamber into the sludge treatment tank. The sludge treatment tank includes: an anaerobic decomposition chamber for allowing the sludge components in the wastewater transferred by the transferring means to undergo anaerobic decomposition; an aerobic decomposition chamber for allowing treated wastewater derived from the anaerobic decomposition chamber to undergo aerobic decomposition; and a sedimentation/separation chamber for sedimenting treated wastewater derived from the aerobic decomposition chamber for separation. In this arrangement, transferring the wastewater from the upstream most treatment chamber into the sludge treatment tank by the transferring means enables to purify the sludge components in the wastewater stepwise in the anaerobic decomposition chamber, the aerobic decomposition chamber, and the sedimentation/separation chamber.

Yet another wastewater purifying apparatus is provided with a plurality of treatment chambers for stepwise purifying wastewater containing sludge components such as sewage discharged from a lavatory, and a purified wastewater storage container for storing purified wastewater derived from a downstream most treatment chamber at a most downstream position of the treatment chambers. The apparatus comprises: a sludge treatment tank arranged parallel to the treatment chamber; and transferring means for transferring the wastewater from the upstream most treatment chamber into the sludge treatment tank. The sludge treatment tank includes: a decomposition chamber for decomposing the sludge components in the wastewater transferred by the transferring means; and a wastewater storage chamber for storing the wastewater derived from the decomposition chamber. Thereby, a gas component generated in the decomposition chamber by the decomposition of the sludge components is emitted into the ambient air, and the wastewater stored in the wastewater storage chamber is refluxed into the decomposition chamber to decompose the sludge components in the refluxed wastewater. In this arrangement, the sludge components in the wastewater which have been transferred from the treatment chamber(s) at the upstream of a wastewater treatment tank into the sludge treatment tank by the transferring means can be completely decomposed and digested in the sludge treatment tank. This enables to properly decompose the wastewater without the need of providing means for incinerating residual sludge in the sludge treatment tank, releasing the wastewater after the decomposition, scooping out the residual sludge, or performing a like operation.

As mentioned above, the wastewater purifying apparatus enables to perform expedient and sophisticated purification treatment of wastewater containing sludge components such as sewage discharged from a lavatory, or miscellaneous effluents generated by pulverizing garbage by a disposer.

The invention claimed is:

1. A wastewater purifying apparatus comprising:
   a wastewater treatment tank including a plurality of treatment chambers for stepwise purifying wastewater, said plurality of treatment chambers including an upstream most treatment chamber with an opening in an upper portion thereof, at least one intermediate treatment chamber downstream of the upstream most treatment chamber, a downstream most treatment chamber and a purified wastewater storage chamber for storing purified wastewater derived from the downstream most treatment chamber at a most downstream position of the plurality of treatment chambers, the opening in the upper portion of the upstream most treatment chamber permitting wastewater from the upstream most treatment chamber to be drained therethrough by wastewater suction means;
   a purified wastewater storage container provided independently of the wastewater treatment tank for storing purified wastewater derived from the purified wastewater storage chamber;
   reflux means for refluxing treated wastewater from the at least one intermediate treatment chamber and the downstream most treatment chamber into the upstream most treatment chamber as the wastewater is being drained from the upstream most treatment chamber by the wastewater suction means, the reflux means formed in a lower part on a wall of the wastewater treatment tank; and
   purified wastewater supply means for supplying the purified wastewater stored in the purified wastewater storage container through the opening and into the upstream most treatment chamber as washing water.

2. The wastewater purifying apparatus according to claim 1, further comprising:
   abnormality detecting means for detecting an abnormality of the purified wastewater stored in the purified wastewater storage container; and
   a transmitter for transmitting an abnormality detection signal to an administrator if the abnormality is detected by the abnormality detecting means.

3. The wastewater purifying apparatus according to claim 1, further comprising:
   a wastewater storage tank arranged parallel to the upstream most treatment chamber; and
   transferring means for transferring the wastewater from the upstream most treatment chamber into the wastewater storage tank.

4. The wastewater purifying apparatus according to claim 3, further comprising:
   stored amount detecting means for detecting an amount of the purified wastewater stored in the purified wastewater storage container; and
   controlling means for controlling the transferring means to transfer the wastewater from the upstream most treatment chamber into the wastewater storage tank if it is detected that the amount of the purified wastewater stored in the purified wastewater storage container is equal to or larger than a reference value in accordance with a detection signal from the stored amount detecting means.

5. The wastewater purifying apparatus according to claim 1, further comprising:
a sludge treatment tank arranged parallel to the upstream most treatment chamber; and
transferring means for transferring the wastewater from the upstream most treatment chamber into the sludge treatment tank,
the sludge treatment tank including:
an anaerobic decomposition chamber for allowing the sludge components in the wastewater transferred by the transferring means to undergo anaerobic decomposition;
an aerobic decomposition chamber for allowing treated wastewater derived from the anaerobic decomposition chamber to undergo aerobic decomposition; and
a sedimentation/separation chamber for sedimenting treated wastewater derived from the aerobic decomposition chamber for separation.

6. The wastewater purifying apparatus according to claim 5, further comprising:
heating means for heating the sludge components in the wastewater transferred to the anaerobic treatment chamber of the sludge decomposition tank to 70° C. or higher to accelerate decomposition of fibers and horns in the sludge components.

7. The wastewater purifying apparatus according to claim 1, further comprising:
a sludge treatment tank arranged parallel to the wastewater treatment tank; and
transferring means for transferring the wastewater from the upstream most treatment chamber into the sludge treatment tank,
the sludge treatment tank including:
a decomposition chamber for decomposing the sludge components in the wastewater transferred by the transferring means; and
a wastewater storage chamber for storing the wastewater derived from the decomposition chamber,
whereby a gas component generated in the decomposition chamber by the decomposition of the sludge components is emitted into the ambient air, and the wastewater stored in the wastewater storage chamber is refluxed into the decomposition chamber to decompose the sludge components in the refluxed wastewater.

8. A wastewater purifying apparatus comprising:
a wastewater treatment tank having a plurality of treatment chambers for stepwise purifying wastewater, said plurality of treatment chambers including an upstream treatment chamber with an opening in an upper portion thereof, at least one intermediate treatment chamber downstream of the upstream most treatment chamber, a downstream most treatment chamber and a purified wastewater storage chamber for storing purified wastewater derived from the downstream most treatment chamber at a most downstream position of the plurality of treatment chambers, the opening in the upper portion of the upstream most treatment chamber permitting wastewater from the upstream most treatment chamber to be drained therethrough by wastewater suction means;
a purified wastewater storage container provided independently of the wastewater treatment tank for storing purified wastewater derived from the purified wastewater storage chamber;
a refluxing equipment for refluxing treated wastewater from the at least one intermediate treatment chamber and the downstream most treatment chamber into the upstream most treatment chamber as wastewater is being drained from the upstream most treatment chamber by the wastewater suction means, the refluxing equipment formed in a lower part on a wall of the wastewater treatment tank; and
a purified wastewater supplier for supplying the purified wastewater stored in the purified wastewater storage container through the opening and into the upstream most treatment chamber as washing water.

9. The wastewater purifying apparatus according to claim 8, further comprising:
an abnormality detector for detecting an abnormality of the purified wastewater stored in the purified wastewater storage container; and
a transmitter for transmitting an abnormality detection signal to an administrator if the abnormality is detected by the abnormality detector.

10. The wastewater purifying apparatus according to claim 8, further comprising:
a wastewater storage tank arranged parallel to the upstream most treatment chamber; and
a transferer for transferring the wastewater from the upstream most treatment chamber into the wastewater storage tank.

11. The wastewater purifying apparatus according to claim 10, further comprising:
a stored amount detector for detecting an amount of the purified wastewater stored in the purified wastewater storage container; and
a controller for controlling the transferer to transfer the wastewater from the upstream most treatment chamber into the wastewater storage tank if it is detected that the amount of the purified wastewater stored in the purified wastewater storage container is equal to or larger than a reference value in accordance with a detection signal from the stored amount detector.

* * * * *